Patented Sept. 17, 1929

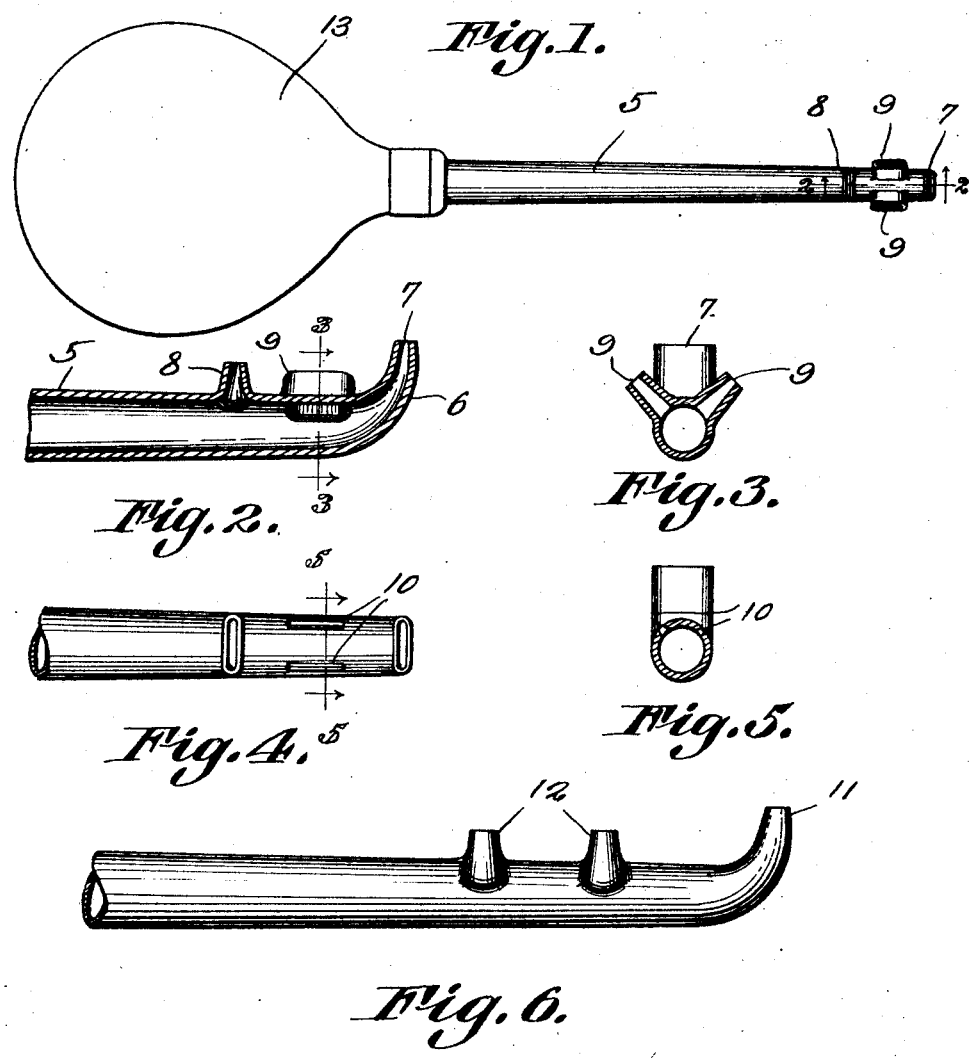

1,728,542

UNITED STATES PATENT OFFICE

FREDERICK W. HAMES, OF ATLANTA, GEORGIA

SYRINGE

Application filed February 21, 1929. Serial No. 341,697.

This invention relates to a syringe, and more particularly to a dental syringe, the primary object of the invention being to provide a syringe having nozzles so constructed that it may be positioned against the teeth to direct a wide spray of liquid between the teeth to cleanse them.

A further object of the invention is to provide a nozzle including a body portion having transversely disposed elongated nozzles and lateral nozzles disposed longitudinally of the body portion, the latter nozzles being arranged between the first mentioned nozzles for spraying the gum margin adjacent to the teeth to treat the gums for various diseases of the gums.

A still further object of the invention is the provision of a plurality of spaced nozzles, the spaces between the nozzles being approximately the distance equal to the widths of teeth, so that the nozzles will be guided to their proper positions to direct sprays between the adjacent edges of teeth.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a syringe constructed in accordance with the present invention.

Figure 2 is a sectional view taken on line 2—2 of Figure 1.

Figure 3 is a sectional view taken on line 3—3 of Figure 2.

Figure 4 is a bottom plan view of a modified form of the invention.

Figure 5 is a sectional view taken on line 5—5 of Figure 4.

Figure 6 is a side elevational view illustrating a still further modified form of the invention.

Referring to the drawing in detail, the syringe includes a body portion indicated by the reference character 5, the body portion being tubular in formation and tapered towards the discharge end thereof, as clearly shown by Figure 1 of the drawing.

The outer extremity of the body portion 5 is curved laterally as at 6 and flattened providing an elongated discharge opening 7, at the end of the body portion. Spaced from the laterally extended end 6, is a transverse nozzle 8, which is also elongated to cause the liquid passing from the nozzle to take the form of a wide spray. The distance between the end portion 6 and nozzle 8 is approximately the same as the width of a tooth so that when the syringe is positioned, the nozzles may be placed over the adjacent edges of teeth to the end that the sprays of liquid passing from the nozzles will be directed to points between the adjacent edges of the teeth.

Lateral elongated nozzles 9 extend at oblique angles with respect to the body portion 5 and are arranged between the nozzles 7 and 8 so that when the syringe is positioned for spraying between adjacent teeth, the nozzles 9, or the nozzle 9 adjacent to the gum line will spray the teeth at the gum line to the end that medicine for treating gum diseases may be directed to the gum, at the place of infection.

In Figures 4 and 5 of the drawing the body portion is provided with slits 10 disposed longitudinally thereof and arranged adjacent to the sides of the body portion to direct sprays against the teeth at the gum line. In the form of the invention as shown by Figure 6 the end of the body portion extends laterally as at 11 providing a nozzle, and a pair of spaced nozzles 12 are arranged along one surface of the body portion, the nozzles 11 and 12 being transversely disposed and elongated to project a wide spray.

A bulb such as indicated at 13 is used in connection with the body portion 5, and the body portion 5 may be secured to the bulb in any suitable and well known manner to the end that when the bulb has been filled with liquid for spraying the teeth, the bulb when pressed, will act to force the liquid through the body portion and nozzles to accomplish the purpose of the invention.

While I have shown and described a bulb for forcing the liquid through the body portion, it is to be understood that this body portion may be used in connection with any type of forced feed mechanism, without departing from the spirit of the invention.

I claim:

1. A syringe of the class described including a tubular body portion, one end of the body portion being extended laterally defining a nozzle, and the end of said nozzle being flattened providing an elongated opening.

2. A syringe of the class described including a tubular body portion tapered towards its outer end, the outer end of the body portion being flattened and extending laterally defining a nozzle, and an elongated transversely disposed nozzle secured to the body portion in spaced relation with the first mentioned nozzle.

3. A syringe of the class described including a tubular body portion, nozzles having elongated openings, disposed in spaced relation with each other adjacent to one end of the body portion, said nozzles being elongated transversely of the body portion, and nozzles elongated longitudinally of the body portion and disposed between the first mentioned nozzles.

4. A syringe of the class described including a tubular body portion, the discharge end of the body portion being curved laterally and flattened defining an elongated discharge opening, a nozzle secured to the body portion in spaced relation with the first mentioned nozzle, the last mentioned nozzle being elongated transversely of the body portion, and said body portion having elongated openings disposed laterally thereof and arranged between the first mentioned nozzles.

In testimony that I claim the foregoing as my own, I have hereto affixed my signature.

FREDERICK W. HAMES.